United States Patent [19]

Raymond

[11] 4,236,094
[45] Nov. 25, 1980

[54] IGNITION TRANSDUCER FOR VEHICLE ENGINES

[75] Inventor: Bernard R. Raymond, Paris, France

[73] Assignee: Societe pour l'Equipement de Vehicules, Issy-les-Moulineaux, France

[21] Appl. No.: 920,290

[22] Filed: Jun. 29, 1978

[30] Foreign Application Priority Data

Jul. 1, 1977 [FR] France .............................. 77 20366
Jun. 16, 1978 [FR] France .............................. 78 18078

[51] Int. Cl.³ .......................................... H02K 19/24
[52] U.S. Cl. ..................................... 310/168; 310/111
[58] Field of Search ....................... 310/111, 155, 168

[56] References Cited

U.S. PATENT DOCUMENTS

| | | | |
|---|---|---|---|
| 2,719,930 | 10/1955 | Lehde | 310/111 |
| 2,758,227 | 8/1956 | Reymonenq et al. | 310/155 |
| 3,152,290 | 10/1964 | Cassano et al. | 310/168 X |
| 3,283,189 | 11/1966 | McClelland | 310/155 |
| 3,389,281 | 6/1968 | Ellis | 310/168 |
| 3,473,061 | 10/1969 | Soehner et al. | 310/168 X |

*Primary Examiner*—Donovan F. Duggan
*Attorney, Agent, or Firm*—Brisebois & Kruger

[57] ABSTRACT

A magnetic interrupter type transducer for providing an ignition signal with alternating peaks and varying progressively between the peaks. The shape of the signal is a function of the configuration of the opposed surfaces between a rotor and an adjacent pole tip of a magnetic circuit which generates the ignition signal by electromagnetic induction. The variation in volume of the air gap produced during rotation of the rotor provides the signal of the desired characteristics.

25 Claims, 8 Drawing Figures

IGNITION TRANSDUCER FOR VEHICLE ENGINES

SUMMARY OF THE INVENTION

It is known that in order to effect ignition in internal combustion engines of automotive vehicles, one uses an ignition coil having a primary winding and a secondary winding, the secondary winding transmitting to the spark plugs a high voltage discharge when the supply circuit of the primary winding is opened. At each ignition stroke, one must thus open the supply circuit of the primary winding. It has already been proposed to achieve this function, either mechanically, by means of breaker contacts, or electronically.

In electronic ignition, one places a transducer generally constituted by a wheel or rotor which rotates between two facing pole tips of a magnetic circuit, the wheel of the transducer having pole teeth and being driven by the motor to effect ignition. When the teeth of the pole wheel pass in front of the pole tips, an abrupt variation in flux in the magnetic circuit occurs and this variation in flux is used to generate a voltage in a winding on the magnetic circuit. This voltage occurs in the form of an alternating pulse comprising a positive half pulse and a negative half pulse and the passage to zero of the voltage is used to control, through a pulse shaper circuit, a transistor which opens the supply circuit of the primary winding of the ignition coil.

In this type of electronic ignition, it has already been proposed to specify, within each cycle, the time duration the supply circuit of the primary winding of the ignition coil should be closed, to obtain in each cycle, a complete charge of the coil with minimum loss from Joule effect. In these ignition systems, it is necessary to determine the closure time of the primary circuit after the start of a cycle, taking into consideration the duration of the cycle. Thus it has been proposed to generate a sawtooth voltage by means of an integrator, to calculate each ignition time, and when this voltage attains a predetermined threshold, to trip or open the primary circuit. This technique is satisfactory, but requires that the electronic device connected to the transducer, be relatively complicated. It has also been proposed to use transducers whose output signal is not constituted by a series of alternate pulses separated by zones of zero voltage, but by a more continuously variable signal, the pulses of which are obtained at the passage of the movable pole teeth in front of the pole tips being connected between each other in such a way that the voltage varies, if not in a continuous fashion in the interval between the pulses, at least in a progressive fashion. This type of signal is obtained by generating greater peak voltages and by decreasing the time interval between two successive pulses. To obtain a greater peak voltage, it is necessary to increase the size of the induction coil of the transducer and the circulating magnetic flux; to decrease the time between two pulses, the number of rotor teeth of the transducers can be increased. The use of these two means leads to bulky or voluminous transducers whose installation is relatively difficult. However, the progressive variation of the voltage between the two successive pulses allows a signal to be provided equivalent to that which one would obtain by generating a sawtooth voltage with an integrator, in the system previously described. This type of transducer thus permits the closure time of the primary circuit to be determined by directly comparing the output signal of the transducer with a predetermined voltage threshold, which enables the electronic interface between the transducer and the ignition coil to be simplified.

Thus it can be ascertained that, in existing devices, either the transducer can be made relatively small and with slight encumberance, and it is then necessary to use a relatively costly electronic interface, or an inexpensive interface can be used but the transducer is then relatively voluminous and difficult to put in place.

The present invention has as an object a magnetic transducer, usable in particular to effect engine ignition in an automotive vehicle, and particularly constant energy ignition, the transducer having the advantage of small size and reduced volume and of nevertheless providing an output signal such that the use of a complicated electronic interface can be avoided while providing the desired control. The transducer according to the invention enables an output signal to be obtained constituted by a series of alternate periodic pulses, the voltage between the pulses being progressively variable in spite of the small size of the transducer. In a first advantageous embodiment of the invention, the mobile element of the transducer is constituted by two superimposed wheels, one of which furnishes an output signal formed by alternate pulses separated by zones of zero voltage and the other furnishes a periodic output signal continuously and preferably linearly variable. The winding of the magnetic circuit, whose pole tips cooperate with the two superimposed wheels, produces an output signal which is the sum of the two signals corresponding to the two wheels. In a second advantageous embodiment, the mobile element of the transducer is a single wheel which furnishes the desired signal constituted by alternate pulses separated by zones of progressively variable voltage.

Consequently, the present invention has as an object, the new industrial product which constitutes a variable flux magnetic transducer permitting a periodic electric signal to be obtained, whose form as a function of time comprises an abrupt variation followed by a progressive variation in the reverse direction, the transducer being constituted by at least one fixed element comprising at least one pole tip forming a pole of magnetic circuit, and at least one mobile element comprising at least one pole tooth displacing itself in rotation in a predetermined direction in relation to the above-mentioned fixed element and assuring the closure of the magnetic circuit when a pole tooth is opposite a pole tip, characterized by the fact that the volume of one or several air gaps between the fixed element and the mobile element during a constant velocity displacement of the mobile element passes from a minimum value to the following minimum value by a rapid increase followed by a progressive variation and then a rapid decrease.

In a preferred embodiment, the rapid increase in the volume of the air gap is due to an increase of the relative distance between a part of the walls of the opposed fixed and mobile elements in the air gap, during displacement of the mobile element in relation to the fixed element. According to a first possible embodiment, the progressive variation of the clearance volume is due to a progressive variation of the relative distance of at least one part of the opposed walls of the fixed and mobile elements in the air gap, this part having a constant surface or varying surface. According to another possible embodiment, the air gap volume is defined between opposite walls of the fixed and mobile elements, walls in which one part is spaced a small constant relative distance while the other part is spaced a great constant relative distance, the relation of the surfaces of these two parts being progressively changing.

The progressive change of the air gap can correspond to a continuous increase; it can likewise be provided that the progressive change of the air gap corresponds to an increase followed by a decrease.

According to a first embodiment, the mobile element of the transducer according to the invention is constituted of two superimposed wheels driven by a small shaft; the two wheels of the mobile element cooperate with the same pole tips of the fixed element.

According to the first variation of the transducer with two wheels, each pole tip, as viewed from the axis of the mobile element, has a constant width along the entire height of the mobile element, the first wheel comprising radial teeth of small width separated over the entire height of the wheel by deep recesses or hollowed out areas while the second wheel comprises, aligned with the recesses of the first wheel, progressively hollow areas in the region between the planes of the sides of adjacent teeth of the first wheel; between two successive teeth of the first wheel, the second wheel as a cylindrical lateral surface and a hollow zone defined by a curve C of intersection of the cylindrical lateral surface and having a surface S, the curve C extending continuously between the radial planes passing through two successive pole teeth of the first wheel.

According to a first embodiment of this first variation, the surface S is a plane perpendicular to the bisector plane of the dihedron defined by the common axis of the two wheels and by two successive pole teeth of the first wheel; curve C is tangent to one of the two planes which bounds the second wheel and is perpendicular to its axis, the said curve C intersecting the other plane which bounds the second wheel and is perpendicular to its axis, near radial planes passing through the pole teeth.

According to a second embodiment of this first variation, the surface S is a dihedron, whose edge is a radial of the second wheel and one of whose planes contains the axis of the second wheel, the edge of the dihedron being essentially aligned with a pole tooth of the first wheel in one of the boundary planes which bounds the second wheel and is perpendicular to its axis, the intersection of the other boundary plane with the plane of the dihedron which does not contain the axis of the second wheel being near a radial plane passing through an adjacent pole tooth of the first wheel. The depth of the hollowed out zone of the lateral surface of the second wheel, when one passes from one tooth to the adjacent tooth, advantageously changes.

According to a second variation of the embodiment of the sensor with two wheels, each pole tip, as viewed from the axis of the mobile element, has a width which changes when moved parallel to the axis. In this case, it is preferred that the second wheel be identical to the first and that it have narrow pole teeth projecting in relation to the adjacent hollowed out zones, the pole tip having a constant width in front of the first wheel and a changing width in front of the second wheel; advantageously, each pole tip, in front of the second wheel, has, as seen from the axis of the wheel, a triangular form, whose base, in a boundary plane of the wheel perpendicular to its axis, has a width essentially equal to the distance between two successive pole teeth as seen from the axis of the wheel.

It is clear that the first wheel furnishes a signal constituted by a succession of alternate pulses separated by zones of zero voltage and that the second wheel furnishes, because of the progressiveness of the variation in air gap clearance, a progressively variable signal between the pulses provided by the first wheel. The result is an addition of the two signals to provide a signal equivalent to that which one obtains with a large and cumbersome transducer, which is difficult to install, and without which it would have been necessary to increase the number of teeth, to increase the magnetic flux, or to increase the number of turns in the winding of the sensor.

According to the second embodiment, the mobile element of the transducer according to the invention is a single wheel. Advantageously, the single wheel comprises radial teeth of slight width, separated over the entire height of hollowed out zones defined by a straight cylindrical wall and/or straight prismatic wall.

In a first variation of the transducer with a single wheel, each pole tip, as viewed from the axis of the wheel, has a constant width over the entire height of the wheel; preferably, the depth of the hollow zones of the lateral surface of the wheel, measured radially in relation to the tips of the teeth, changes progressively when one passes from one radial tooth to the next; the walls of the above-mentioned hollow zones are defined by a common circular cylindrical surface cut by planes, the radial teeth projecting from the said cylindrical surface on both sides of the cylindrical surface cut by a plane; such secant planes are all tangent to a common cylinder having for an axis the axis of the wheel, two adjacent secant planes being positioned according to a dihedron whose bisector plane is essentially identical with the median radial plane of the tooth which is situated between these two adjacent secant planes.

According to a second variation of the transducer with a single wheel, each pole tip, as viewed from the axis of the wheel, has a width which varies when it is moved parallel to the axis, i.e. the width varies along the height of the pole tip. In this case, it is preferred that the depth of the hollow zones of the lateral surface of the wheel, measured radially in relation to the tips of the teeth, be essentially constant when one passes from one radial tooth to the next; advantageously, each pole tip has a constant width in front of one part of the height of the wheel and a changing width in front of the other part of the height of the wheel; in its zone of changing width, each pole tip has, as viewed from the axis of the wheel, a triangular form, whose base is located in a boundary plane perpendicular to the axis of the wheel and has a width essentially equal to the distance between two successive pole teeth as viewed from the axis of the wheel.

To better understand the objects of the invention, four embodiments will now be described, purely as illustrative and non-limiting examples, and shown schematically in the attached drawings.

BRIEF DESCRIPTION OF THE DRAWINGS

Referring to FIGS. 1 and 2, it can be seen that the two pole tips of the fixed element of the transducer according to the invention have been designated by 1. This fixed element constitutes a magnetic circuit comprising a permanent magnet 2, an inductive winding 3 wound on a core 4, good magnetic connections, not shown, being made between all these elements in such a way as to permit the flow of magnetic flux between the two pole tips, when the magnetic circuit is closed.

Figure 1:
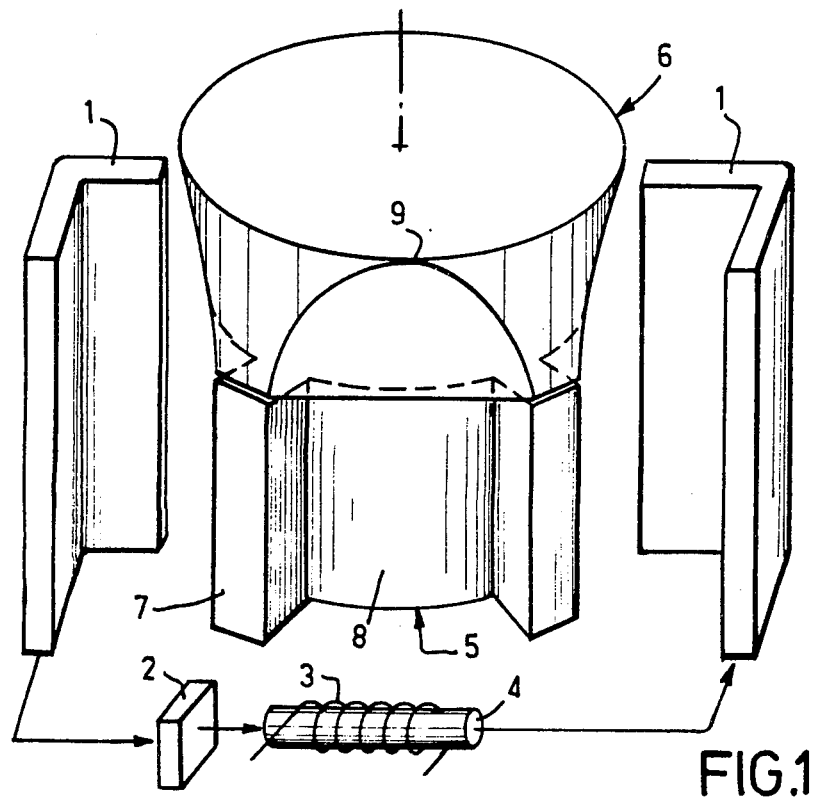
FIG. 1 shows, schematically in exploded (expanded) perspective, a first embodiment of the first variation of a transducer with two wheels according to the invention.

Between the two pole tips 1 are two superimposed pole wheels designated by 5 and 6 in their assembly. The lower wheel 5 is a wheel of standard type comprising four narrow pole teeth 7 projecting out of intermediate hollow zones 8. Pole tips 1 facing pole wheels 5 and 6, the pole tips 1 have rectangular sections whose height is equal to the total height of the superimposed wheels 5 and 6 and whose width is equal to the width of pole teeth 7. Wheel 6 is fastened to wheel 5 and it is mounted on the same shaft: the two wheels 5 and 6 can in addition be made in a single part if desired. Wheel 6 has a cylindrical lateral surface cut by secant plane tangent to the same cone having for an axis the common axis of the two wheels 5 and 6 and with its apex below wheel 6. Each of these planes intersects the cylindrical lateral surface of wheel 6 in an ellipse which is tangent to the upper boundary plane of wheel 6 at a point 9, and which passes through the two summits of the sides of two adjacent teeth 7 which border the hollow zone 8 above which point 9 of the ellipse section is found.

Figure 6:
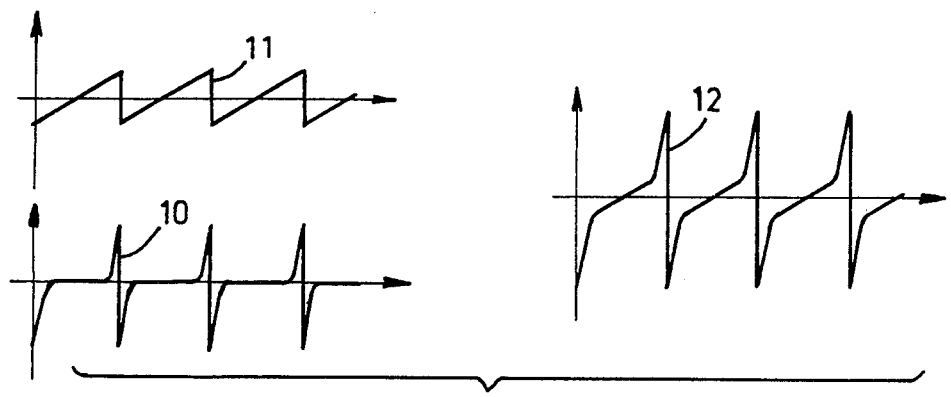
FIG. 6 shows the voltage obtained by means of a transducer according to the invention, such as for example that of FIG. 1.

In a known manner, the part of the transducer corresponding to wheel 5 enables a signal 10 to be obtained which is shown in FIG. 6. This signal comprises a series of alternate pulses separated by zones of zero voltage. Wheel 6 provides an approximately sawtoothed signal, designated by 11 in FIG. 6. Since the two wheels function in parallel on the magnetic circuit, coil 3 provides a signal, which is the sum of the two signals corresponding to the two wheels 5 and 6; this signal has been designated by 12 in the drawing. For the representation of signals 10, 11, 12, the voltages are the ordinates and the times are the abscissae.

Figure 3:
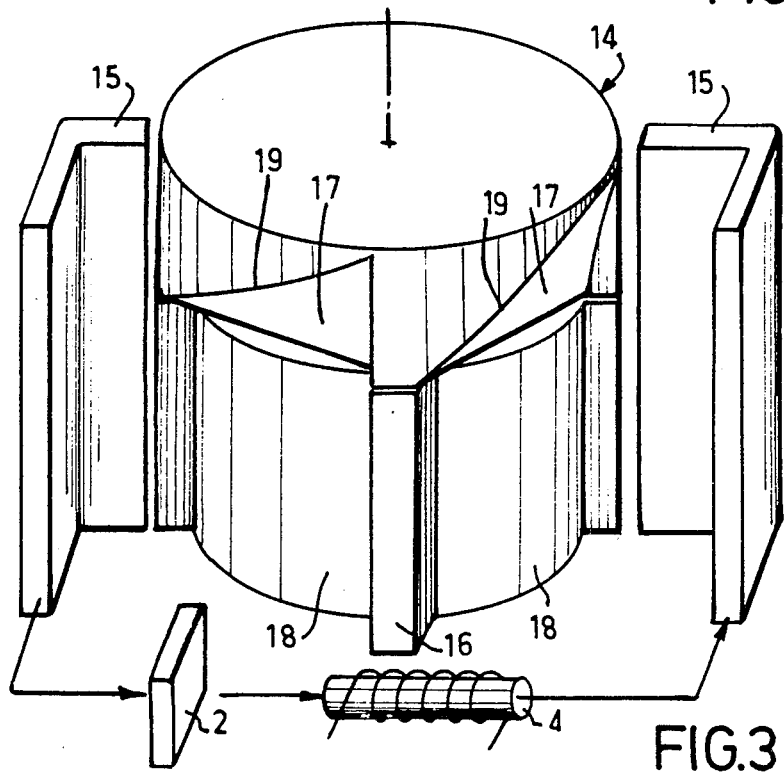
FIG. 3 shows, schematically in perspective, a second embodiment of the first variation of the transducer with two wheels, according to the invention.
Figure 2:
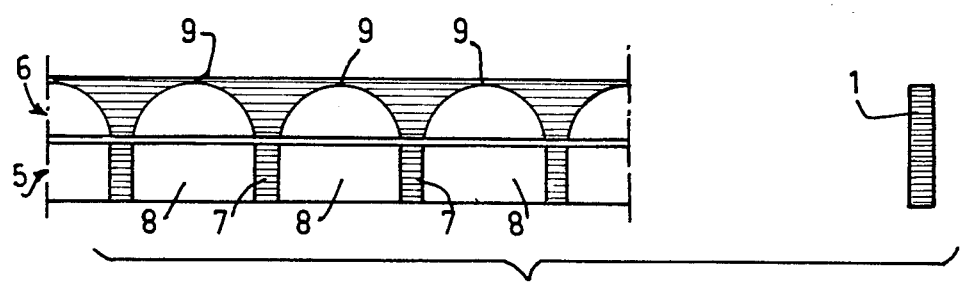
FIG. 2 shows the flat unwinding of the lateral surfaces of the wheels of the transducer of FIG. 1 and the section of the pole tip of the associated fixed element of the magnetic circuit.
Figure 4:
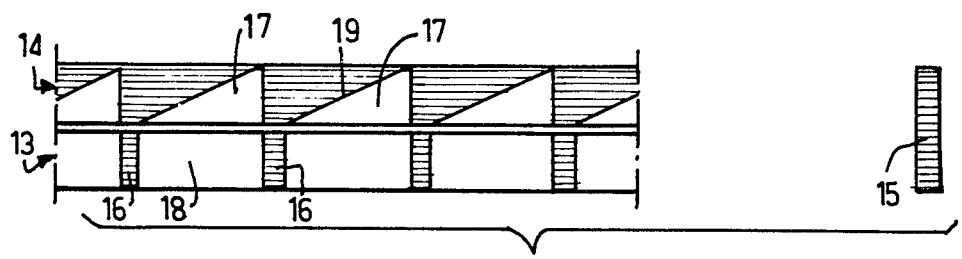
FIG. 4 shows a flat unwinding of the lateral surface of the wheels of the transducer of FIG. 3 as well as the section of the pole tips of the corresponding fixed element.

Referring now to FIGS. 3 and 4, which show another embodiment of the transducer according to the invention, it can be seen that the first wheel of the transducer has been designated by 13 and the second wheel by 14. Wheel 13 is identical to wheel 5 of the first embodiment. The two wheels 13 and 14 cooperate with pole tips 15 identical to those which have been described in the first embodiment. Pole tips 15 are part of a magnetic circuit identical to that which has been described in FIG. 1. Pole wheel 14, has a lateral cylindrical surface, which is notched in alignment with each recess 18 defined between two successive pole teeth 16 of wheel 13. The notches formed in the cylindrical lateral surface of the wheel 14 have been designated by 17 in the drawing and are defined by two planes, one of which passes through the common axis of the two wheels 13 and 14 and through the edge of a pole teeth 16, and the other provides, on the flat development of FIG. 4, a trace constituted by an oblique line 19 diagonally traversing the zone of the lateral surface of wheel 14, which corresponds to the zone of the lateral surface included between two teeth 16 of wheel 13. As is evident from FIG. 3, this second plane is defined by a line 35 extending between the roots of the facing sides of adjacent teeth, and a line 36 extending from one end of line 35, upwardly to the cylindrical surface of wheel 14 at its top.

The two wheels 13 and 14 cooperate with the same pole teeth, they work in parallel and the single winding of the transducer of the invention provides an output signal which is the sum of the two signals from the wheels. In this way a signal 12 is obtained which is analogous to that which has been shown in FIG. 6.

Figure 5:
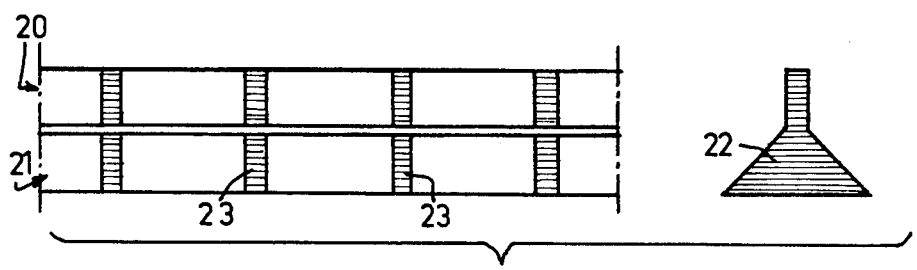
FIG. 5 shows the flat development of two transducer wheels, according to a second variation of the invention, as well as the section of the pole tips of the corresponding fixed element.

According to another embodiment, shown in FIG. 5, two pole wheels 20 and 21 of the transducer according to the invention are identical. Each of the wheels 20 and 21 is identical to wheel 5 of the embodiment of FIG. 1. Wheels 20 and 21 cooperate with pole tips 22 which do not have a constant width along their length: the part of the pole tip 22, which is located opposite wheel 20 is of constant width, but the part which is opposite wheel 21 has a width which increases according to a triangular section to span at the bottom of wheel 21, a space corresponding to a 90° angle opposite pole wheel 21. In other words, the peripheral length of the pole tip 22, at the base of wheel 21, is equal to the peripheral length, which separates the median edges of two successive teeth 23 of wheel 21.

It is clear that the signal furnished by wheel 20 is identical to signal 10 of FIG. 6. In addition, because of the particular shape of pole tip 22, the signal furnished by wheel 21 is essentially analogous to signal 11 of FIG. 6. As a result the transducer according to this variation permits obtaining a signal analogous to that which is designated by 12 in FIG. 6, since the single winding of the fixed element of the transducer furnishes a signal which is the sum of the two signals from the two wheels 20 and 21.

In the examples of embodiments which are about to be described, the heights of the two wheels of the transducer are equivalent; however, the relative heights of the two wheels can be modified in order to influence the shape of the output signal.

Figure 7:
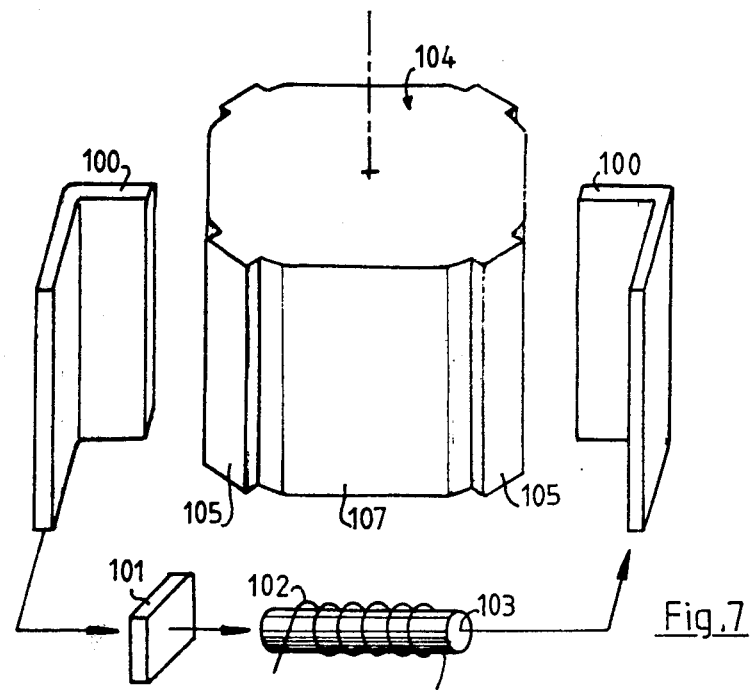
FIG. 7 shows, schematically in exploded perspective, a first variation of a transducer with a single wheel according to the invention.
Figure 8:
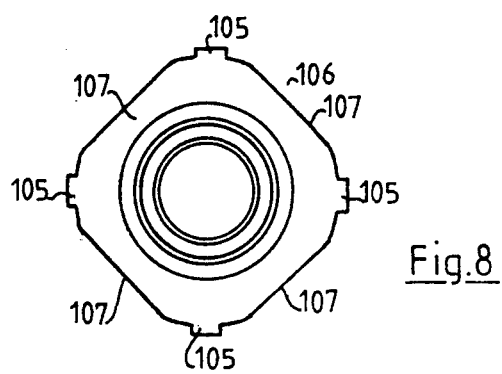
FIG. 8 shows a view from above of the wheel of the transducer of FIG. 7.

FIGS. 7 and 8 illustrate a first variation of an embodiment of the transducer with a single wheel. The two pole tips of the fixed element of the transducer according to the invention are designated by 100. The fixed element constitutes a magnetic circuit comprising a permanent magnet 101, a winding 102 wound on core 103, and magnetic connections not shown between all these elements to permit the flow of the magnetic flux between the two pole tips 100, when the magnetic circuit is closed.

Between the two pole tips 100 is a single pole wheel designated by 104 in its entirety. Pole wheel 104 comprises four narrow teeth 105 projecting out of intermediate hollow zones. The pole tips 100, opposite pole wheel 104, are rectangular sections whose height is equal to the height of wheel 104 and whose width is equal to the width of pole teeth 105.

As can be easily seen in FIG. 8 of the drawings, the intermediate hollow zones of wheel 104 are bounded by a circular cylindrical surface from which teeth 105 project radially. The base circle of this cylindrical surface has been designated by 106 (FIG. 8). The cylindrical lateral surface of wheel 104 is cut by four secant planes tangent to the same cylinder having as an axis the axis of wheel 104. Each of the secant planes forms thus between two successive teeth 105 a flat surface 107 whose two sides are parallel to the generatrices of the cylindrical lateral surface of wheel 104. Two adjacent flat surfaces 107 are disposed according to a dihedron, whose bisector plane passes through the radial median plane of the tooth 105 which is located between the two flat surfaces 107.

Thus, because of the presence of flat surfaces 107, the depth of the hollow zones or spaces between two adjacent teeth 105, is not constant but varies progressively from one tooth to the next.

When wheel 104 rotates about its axis the volume of the air gap passes from one minimum value to the next minimum value when the wheel 104 has turned through an angle equal to the angular distance between two adjacent teeth 105, in such a way as to present a new tooth 105 in front of a pole tip 100. Between these two minimum values, the volume of the air gap undergoes a rapid increase at the instant when a tooth 105 in front of a pole tip 100, is succeeded by the adjacent hollow. Following this rapid increase in a progressive variation, during the passage of the hollow intermediate zone 107 opposite pole tip 100, then a rapid decrease due to the arrival of the next tooth 105 in front of the pole tip.

The signal furnished by wheel 104 is identical to the signal designated by 12 in FIG. 6, that is, a signal constituted by a series of alternate pulses emitted in a periodic fashion, the voltage between these pulses being progressively variable.

The second variation of the sensor with a single wheel has not been shown because it corresponds rigorously to the variation illustrated in FIG. 5, with the single difference that the two superimposed wheels 20 and 21 which are described there are in this case made in a single piece and from this fact constitute a single wheel.

It is of course understood that the above-described embodiments are in no way limiting and are able to be modified, without going beyond the scope of the invention.

What is claimed is:

1. A flux change magnetic transducer for producing by induction in at least one winding, a periodic electrical signal, said transducer comprising at least one fixed element and at least one mobile element rotatable in a predetermined direction in relation to the said fixed element, cooperating wall means on said fixed element and said mobile element for generating in said at least one coil, during uniform displacement of said mobile element a periodic electrical signal whose form as a function of time comprises an impulse of a first polarity followed by a progressive change and then an impulse of a second polarity, said cooperating wall means comprising at least one pole tip on said fixed element, at least one pole tooth on said mobile element, and cooperating surfaces on said fixed and mobile elements; said pole tip, pole tooth, and cooperating surfaces defining an air gap volume which changes from one minimum value to a following minimum value by a rapid increase followed by a progressive variation and then by a rapid decrease, during a uniform displacement of said mobile element, said wall means generating said signal during a substantial portion of the interval between said impulses so that said progressive change of the signal occurs during a substantial portion of the interval between impulses.

2. A transducer according to claim 1 wherein said wall means generate said signal during substantially the entire portion of the interval between impulses.

3. A transducer according to claim 1, wherein the rapid increase in air gap volume is due to a rapid increase of the relative distance of facing walls of the fixed and mobile elements at said air gap.

4. A transducer according to claim 1, wherein the progressive variation of the air gap is due to a progressive variation of the relative distance of one part of the facing walls of the fixed and mobile elements in the clearance zone, this part having a constant or nonconstant surface.

5. A transducer according to claim 1, wherein the air gap is defined between facing walls of the fixed and mobile elements, one part of said walls being spaced a small constant relative distance while another part of said walls is a greater constant relative distance, the relation of the surfaces of these two parts being progressively variable.

6. A transducer according to claim 1, wherein the progressive variation of the air gap is a continuous increase.

7. A transducer according to claim 1, wherein the progressive variation of the air gap is an increase followed by a decrease.

8. A transducer according to claim 1, wherein the mobile element comprises two superimposed wheels driven by a common shaft, these two wheels cooperating with common pole tips of the fixed element.

9. A transducer according to claim 8, wherein each pole tip, as viewed from the axis of the mobile element has a constant width along the entire height of said mobile element, said first wheel comprising radial teeth of slight width separated over the entire height of the wheel by deeply hollowed zones, said second wheel comprising, aligned with the deeply hollowed zones of the first wheel, progressively hollowed out zones in the region between teeth of said first wheel.

10. A transducer according to claim 9, wherein between two successive teeth of the first wheel, the second wheel presents a cylindrical lateral surface and a hollowed out zone between the teeth bounded by a curve defined by the intersection of the cylindrical lateral surface with a predetermined surface, the curve extending continuously between radial planes passing through two successive pole teeth of the first wheel.

11. A transducer according to claim 10, wherein the predetermined surface is a plane perpendicular to a bisector plane of the dihedron defined by the common axis of the two wheels and two successive pole teeth of the first wheel.

12. A transducer according to claim 11, wherein the curve is tangent to one of two boundary planes perpendicular to the axis of and which bound the second wheel, said curve intersecting the other of said planes which bound said second wheel perpendicular to its axis, near radial planes passing through the pole teeth.

13. A transducer according to claim 10, wherein the predetermined surface is a dihedron, whose edge is a radial of the second wheel and one of the planes of which contains the axis of the second wheel.

14. A transducer according to claim 13, wherein the edge of the dihedron is essentially in front of one pole tooth of the first wheel in one of two boundary planes perpendicular to the axis of the second wheel, the intersection with the other boundary plane of the plane of the dihedron which does not contain the axis of the second wheel being located near a radial plane passing through one pole tooth and adjacent the first wheel.

15. A transducer according to claim 10, wherein the depth of the hollow zone of the lateral surface of the second wheel changes from one tooth to an adjacent tooth.

16. A transducer according to claim 8, characterized by the fact that each pole tip, as viewed from the axis of the mobile element, has a width which varies when the pole tip is displaced parallel to said axis.

17. A transducer according to claims 8 or 16 wherein the second wheel is identical to the first wheel and has narrow pole teeth projecting in relation to the adjacent hollow zones, said pole tip having a constant width in front of the first wheel and varied width in front of the second wheel.

18. A transducer according to claim 17, wherein the varied width of each pole tip, as seen from the axis of the mobile element, comprises a triangular form whose base, in a boundary plane of said mobile element perpendicularly to its axis, has a width essentially equal to the distance between two successive pole teeth.

19. A transducer according to claim 1, wherein the mobile element comprises a single wheel.

20. A transducer according to claim 19, wherein said single wheel comprises radial teeth of slight width, separated over the entire height of the wheel by hollow zones, bounded in part by a straight cylindrical wall.

21. A transducer according to claim 20 wherein said hollow zones are bounded in part by said straight cylindrical wall, and in part by a straight prismatic wall.

22. A transducer according to claims 19 or 20, wherein each pole tip has, as seen from the axis of the wheel, a constant width over the entire height of the said wheel, and the depth of the hollow zones from the lateral surface of the wheel, measured radially in relation to the tips of the teeth, varies progressively between adjacent teeth.

23. A transducer according to claim 22, wherein the walls of said hollow zones are defined by a common circular cylindrical surface intersected by secant planes, the teeth projecting from said cylindrical surface on both sides of the sections of this cylindrical surface through said plane.

24. A transducer according to claim 23, wherein the above said planes are all tangent to a common cylinder having for an axis of the wheel, two adjacent secant planes forming a dihedron whose bisector plane coincides with a median radial plane of a tooth situated between said two adjacent secant planes.

25. A transducer according to claims 19, 20 or 16 wherein each pole tip has a width which is constant in front of one part of the height of the wheel and which is varied in front of another part of the height of the wheel, the depth of the hollow zones of the lateral surface of the wheel, measured radially in relation to the tips of the teeth, being essentially constant between adjacent teeth.

* * * * *